United States Patent [19]
Bregoli et al.

[11] Patent Number: 5,468,573
[45] Date of Patent: Nov. 21, 1995

[54] ELECTROLYTE PASTE FOR MOLTEN CARBONATE FUEL CELLS

[75] Inventors: Lawrance J. Bregoli, Southwick, Mass.; Mark L. Pearson, New London, Conn.

[73] Assignee: International Fuel Cells Corporation, South Windsor, Conn.

[21] Appl. No.: 264,540

[22] Filed: Jun. 23, 1994

[51] Int. Cl.[6] .................................................. H01M 8/14
[52] U.S. Cl. .............................. 429/16; 429/29; 429/44; 429/46; 429/63
[58] Field of Search ................................. 429/16, 29, 46, 429/44, 63

[56] References Cited

U.S. PATENT DOCUMENTS

| | | | |
|---|---|---|---|
| 3,268,365 | 8/1966 | McQuade | 429/16 |
| 4,476,199 | 10/1984 | Takeuchi et al. | 429/34 |
| 4,478,776 | 10/1984 | Mauricle et al. | 429/44 |
| 4,538,348 | 9/1985 | Vine et al. | 429/16 |
| 4,540,640 | 9/1985 | Iacovangelo et al. | 429/41 |
| 4,581,302 | 4/1986 | Vine et al. | 429/16 |
| 4,980,248 | 12/1990 | Fujita | 429/46 |
| 5,021,303 | 6/1991 | Donado | 429/16 |
| 5,256,498 | 10/1993 | Ohzu et al. | 429/16 |

*Primary Examiner*—Prince Willis, Jr.
*Assistant Examiner*—Carol Chaney

[57] ABSTRACT

The electrolyte matrix and electrolyte reservoir plates in a molten carbonate fuel cell power plant stack are filled with electrolyte by applying a paste of dry electrolyte powder entrained in a dissipatable carrier to the reactant flow channels in the current collector plate. The stack plates are preformed and solidified to final operating condition so that they are self sustaining and can be disposed one atop the other to form the power plant stack. Packing the reactant flow channels with the electrolyte paste allows the use of thinner electrode plates, particularly on the anode side of the cells. The use of the packed electrolyte paste provides sufficient electrolyte to fill the matrix and to entrain excess electrolyte in the electrode plates, which also serve as excess electrolyte reservoirs. When the stack is heated up to operating temperatures, the electrolyte in the paste melts, the carrier vaporizes, or chemically decomposes, and the melted electrolyte is absorbed into the matrix and electrode plates.

6 Claims, 1 Drawing Sheet

ELECTROLYTE PASTE FOR MOLTEN CARBONATE FUEL CELLS

The government has rights in this invention pursuant to a contract awarded by the Department of Energy.

TECHNICAL FIELD

This invention relates to the electrolyte loading of electrolyte matrix plates, and electrolyte reservoir plates with liquid electrolyte in a molten carbonate fuel cell stack. More particularly, this invention allows the use of more efficient thin anode flow field plates without unduly limiting the amount of electrolyte incorporated into the stack.

BACKGROUND ART

Molten carbonate fuel cell stacks utilize a melted carbonate electrolyte which is contained in an inert porous matrix plate. Preferably, the stacks will also include excess molten electrolyte which will be contained in electrolyte reservoir plates that also serve as the electrodes. The excess electrolyte will migrate into the matrix plate as needed. Since the carbonate electrolyte in these power plants is a solid at ambient temperatures, the problem is how to load such electrolytes into the matrix and reservoir plates in the stack. One procedure for forming such loaded plates is to form a green tape plate from lithium aluminate matrix particles, and carbonate electrolyte particles which are all held together by a binder. These electrolyte-matrix tapes are placed between the electrodes during assembly of the stack, and the binder is burned out of the tape during stack heat-up, and the carbonate particles are melted in situ in the interstices of the lithium aluminate matrix.

The aforesaid procedure for forming loaded matrix or reservoir plates causes the plate particles to be separated from each other due to the presence of the carbonate particles in the green tape. The resultant lithium aluminate matrix will thus have larger pores than desired, which causes the stack to be dimensionally unstable, and the matrix layers in the stack may collapse to some extent. The cumulative result of matrix collapse of the matrices in a multi-cell stack can cause the operative portions of the stack to slide against the manifold seals to damage the latter.

One manner of avoiding the aforesaid problems which arise has been to place dry powdery carbonate on the electrode plates; preheat the plates prior to forming the stack so as to melt the carbonate powder. Once the carbonate powder melts, it will seep into the electrode/ER plate interstices. This approach has proven feasible for use in stacks which have sufficiently thick electrode/ER plates so as to accommodate a large enough amount of the carbonate powder to ensure that after the electrolyte has filled the matrix plate, a satisfactory amount of the melted electrolyte will remain in the electrode/ER plates to provide sufficient ER electrolyte to replenish electrolyte lost from the matrix plates over an extended period of time to prolong stack life. This type of procedure does not adversely affect stack integrity because the matrix and ER electrode plates are preformed. The aforesaid solution to the problem of electrolyte loading is not effective unless the electrode plates are relatively thick. When relatively thin electrode/ER plates are needed for enhanced stack performance, the preloading of the electrode plate with carbonate electrolyte is ineffective because of the lack of sufficient electrolyte capacity due to the thinness of the electrode.

DISCLOSURE OF THE INVENTION

This invention relates to a method for loading carbonate electrolyte into a molten carbonate fuel cell stack when thin anode plates are incorporated into the stack. "Thin" electrode plates are plates which have a total thickness in the range of 10–40 mil, and preferably about 20 mil. This contrasts with prior art electrode plates having a thickness in the range of about 40–60 mil. The thicker electrode plates of the prior art can result in undesirable operating power losses for the stack. The dry carbonate particles are incorporated into a carrier vehicle that will vaporize or chemically decompose as the stack is heated up to operating temperatures to melt the carbonate particles. The mixture has a pasty consistency which can be forced into the current collector flow field grooves of a preformed metal plate and will adhere to the current collector and anode plates as the stack is assembled. The paste should have a lubricity that ensures that it will not be squeezed laterally off of the flow field plates when the stack is first assembled at room temperature. Thus the percentage of the carrier vehicle is an important consideration in the invention. We have found that a 70% electrolyte/30% carrier vehicle mixture provides adequate flow characteristics at both room temperature and stack heat-up temperatures. The use of a pasty carbonate electrolyte premix allows sufficient carbonate to be loaded into the current collector plate grooves to ensure filling of the electrolyte matrix, and providing an adequate reserve of electrolyte in the anode and cathode plates. The pasty premix will adhere to the current collector plate sufficiently so that significant amounts of the electrolyte will not be dislodged from the plates as the stack is assembled. The carrier vehicle should not be a flammable material, and should either evaporate or chemically decompose without leaving any residue when the stack is heated to operating temperatures to melt the electrolyte. Also, the carrier vehicle should not react with the electrolyte or other materials in the stack. Aqueous materials are thus not suitable for the aforesaid purpose. Materials such as petroleum jelly, bees wax and glycerin have proven to be operable in carrying out the invention.

It is therefore an object of this invention to provide a method for loading carbonate electrolyte into a molten carbonate fuel cell stack.

It is a further object of this invention to provide a method of the character described which provides sufficient electrolyte retention in the stack to supply adequate electrolyte reserves in electrolyte reservoir plates in the stack.

It is an additional object of the invention to provide a method of the character described which admits to the use of thin electrode reservoir plates without unduly limiting the amount of reserve electrolyte retained in the reservoir plates.

These and other objects and advantages will become more readily apparent from the following detailed description of an embodiment of the invention when taken in conjunction with the accompanying drawings, in which:

BEST MODE FOR CARRYING OUT THE INVENTION

Figure 1:
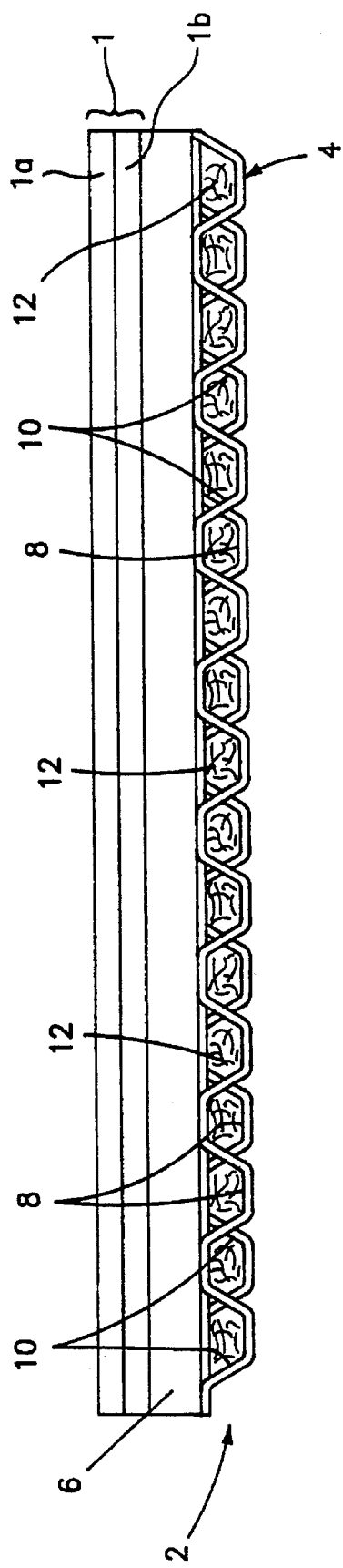
FIG. 1 is a side elevational view of an electrolyte matrix plate, an anode/electrolyte reservoir plate and current collector plate subassembly for a fuel cell stack formed in accordance with this invention shown prior to heating of the stack to operating temperatures.

Referring now to FIG. 1, there is shown an electrode subassembly for use in a molten carbonate fuel cell stack, which subassembly 2 includes an anode/electrolyte reservoir plate 6 and an electrolyte matrix plate 1. The matrix plate 1 is preferably constructed from two separate abutting plates 1a and 1b. The plates 1 and 6 are preformed porous structures which will contain the molten electrolyte when the stack is at operating temperatures. The anode/electrolyte reservoir plate 6 provides the locus of the electron-producing reaction; and the anode/electrolyte reservoir plate 6 holds excess electrolyte which will migrate therefrom into the matrix plate 1 as needed. The assembly also includes a current collector plate 4 which is preferably a stamped metal plate. The current collector plate 4 has a plurality of recesses 8 formed therein which are separated by intervening ribs 10. The recesses 8 form reactant flow paths adjacent to the anode plate 6 during operation of the stack. The current collector recesses 8 are each packed with the electrolyte paste 12. The paste 12 will typically consist of about 70% carbonate powder and about 30% carrier vehicle. The interstices of the plate 6 have been prefilled with electrolyte prior to initial stack heat up, and the paste 12 will be contained in the recesses 8 of the current collector/reactant flow field plate 4.

Figure 2:
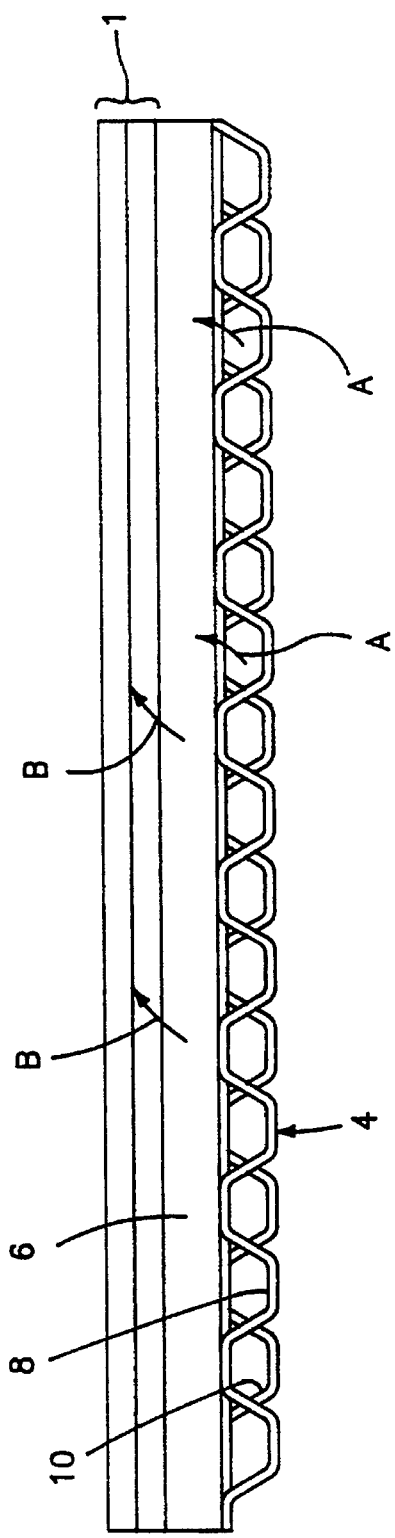
FIG. 2 is a view similar to FIG. 1 but showing the subassembly after the stack has been brought to operating temperatures.

Referring now to FIG. 2, it will be seen that when the stack is heated to operating temperatures, the electrolyte paste will decompose in the sense that the carrier vehicle will be driven off and the carbonate will melt and flow from the recesses 8 into the interstices of the porous plate 6, as indicated by arrows A; and the prefilled electrolyte in the plate 6 will result and flow into the pores of the matrix plate 1, as indicated by arrows B. The matrix plate 1 and the reservoir plate 6 will thus be supplied with sufficient electrolyte to operate the stack over extended periods of time.

It will be readily appreciated that the method of this invention allows for the loading of a sufficient amount of carbonate electrolyte into a molten carbonate fuel cell stack which utilizes thin electrode plates for enhanced performance. The structural plates in the stack are not adversely weakened by the loading method of this invention. The ability to utilize these electrode plates results in a more efficient stack with minimal internal power losses. Preferably only the anode side of the electrodes will be prefilled with the electrolyte, but the cathode side could also be prefilled with electrolyte if so desired.

Since many changes and variations of the disclosed embodiment of this invention may be made without departing from the inventive concept, it is not intended to limit the invention otherwise than as required by the appended claims.

What is claimed is:

1. A method for providing a supply of reserve electrolyte in a molten carbonate fuel cell stack, said method comprising the steps of:
   a) providing an excess amount of electrolyte in the fuel cell stack, said excess electrolyte being contained in a pasty electrolyte mixture comprising solid electrolyte particles which are dispersed in a carrier vehicle; and
   b) heating the stack to a temperature, which temperature will cause the carrier vehicle to be heat-dissipated from the stack, and which temperature will also cause the electrolyte particles to melt and migrate into a porous electrolyte reservoir plate component of the stack.

2. The method of claim 1 further comprising the step of applying said pasty electrolyte mixture to a current collector/reactant flow field component which is adjacent to said electrolyte reservoir plate component in the stack.

3. The method of claim 1 wherein said carrier vehicle is present in the pasty mixture in the amount of about 30% of the pasty mixture.

4. The method of claim 1 wherein said carrier vehicle is glycerin.

5. A molten fuel cell comprising a cathode and an anode positioned on either side and in contact with an electrolyte matrix, and wherein the anode and cathode contain flowfields formed on the side of the electrode opposite the electrolyte matrix useful for the distribution of reactant gases to the electrodes; and wherein the flowfield of at least one electrode contains a pasty electrolyte comprising solid electrolyte particles and a carrier.

6. The fuel cell of claim 5 wherein the carder is glycerin.

* * * * *